Sept. 19, 1939.                F. E. BERTRAND                  2,173,155
                              CONNECTING MEANS
                             Filed Aug. 16, 1937
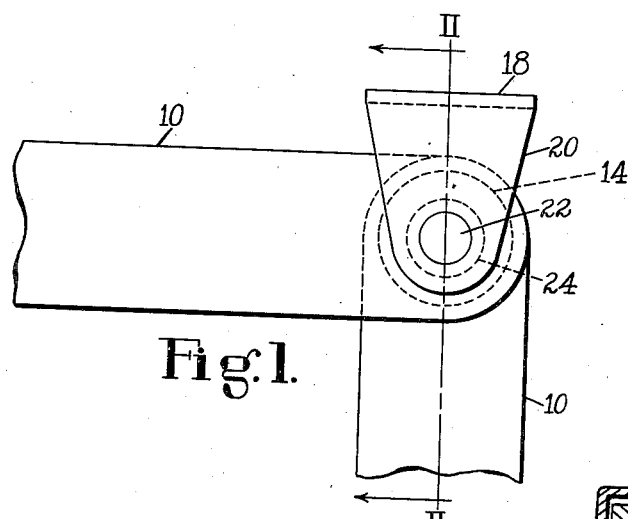
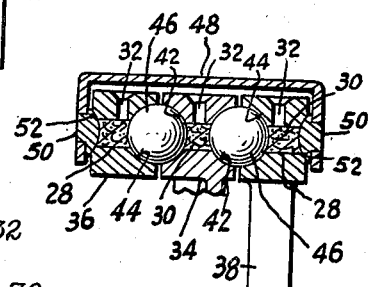
Fig. 4.
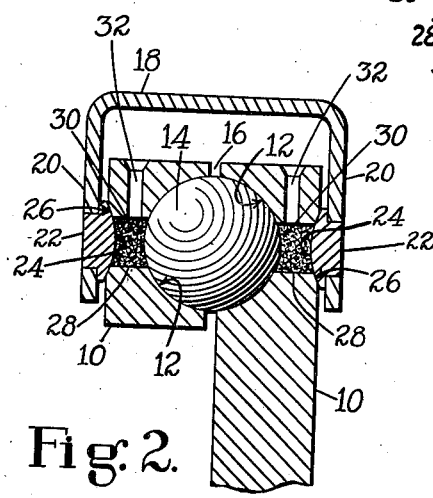
Fig. 2.
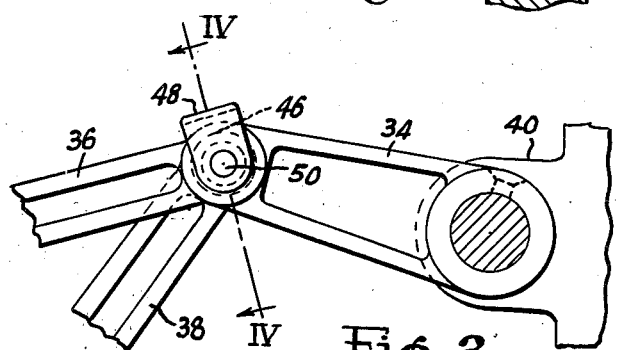
Fig. 3.
INVENTOR
Frederic E. Bertrand
By his Attorney
Harlow M. Davis Patented Sept. 19, 1939

2,173,155

UNITED STATES PATENT OFFICE 2,173,155

CONNECTING MEANS

Frederic E. Bertrand, Lynn, Mass., assignor to United Shoe Machinery Corporation, Paterson, N. J., a corporation of New Jersey Application August 16, 1937, Serial No. 159,307

4 Claims. (Cl. 287—101)

My invention relates to means by which machine elements may be joined, it being herein disclosed as employed for the connection of such members as links and toggle-arms.

An object of the invention is to unite, by simple and durable means, members between which movement is to be transmitted, so that no lost-motion shall be introduced by wear, such means giving some capacity for lateral movement of accommodation between the connected elements, so their alinement need not be exact. In attaining this end, the parts to be joined, two or more in number and which may be considered as primary members, are provided with opposite or registering depressions which receive one or more connecting members, permitting universal movement between the primary members, with which members is combined resilient means for forcing the primary members into engagement with the connecting members. Preferably, each of the depressions is substantially semi-spherical, and the connecting member is a sphere, a plurality of these being employed if more than two primary members are to be united. The means which holds these elements in engagement may consist of such a member as a U-spring, which extends over the edges of the primary members into contact with their outer faces. To facilitate the universal lateral movement of the primary members as they rock upon the sphere or spheres, there are projections from the pressure member which engage the outer faces of the primary members, they being also of spherical contour and lying in complemental depressions. It will be seen that the primary members, by rocking upon the opposite spherical elements, may arrange themselves without binding in planes which are not parallel to each other, and also that the force exerted by the spring will constantly take up wear in the connection, so the joint will always remain tight.

In the accompanying drawing,

Fig. 1 is a side elevation, illustrating one of the forms which my improved connection may assume;

Fig. 2 is a section on the line II—II of Fig. 1;

Fig. 3 shows a modified form of the invention, and

Fig. 4, a section on the line IV—IV of Fig. 3.

The primary members, between which connection is to be made, appear in Figs. 1 and 2 of the drawing as links 10, 10 overlapping at their adjacent ends, they extending therefrom in different directions, and in each of which is a substantially semi-spherical depression 12. These depressions are held in registration by a sphere 14 fitting both depressions and spacing the inner faces of the links from each other at 16. To maintain these elements in engagement, so movement of one link may be communicated to the other, pressure is exerted upon the outer faces of the links by a spring 18, shown as in the form of a U and extending over the edges of the links. In the opposite arms 20, 20 of the spring 18, these arms being substantially parallel to the outer faces of the links, are fixed studs 22, 22, which have at their inner extremities heads 24, 24 of spherical contour. The heads are received in complemental depressions 26, 26 in the outer faces of the links 10, 10. Whether the links are parallel or in intersecting planes, they will rock upon the sphere 14 and the heads 24, 24 smoothly and without binding during the transmission of force from one to the other. Any wear which may occur in the contacting surfaces is at once taken up by the action of the spring, so the connection is always free from looseness or play. Passages through the links between the depressions 12 and 26 are indicated at 28. By inserting in these passages oil-soaked packing 30, the contacting surfaces of the links with the sphere 14 and the stud-heads 24 may be kept lubricated, oil being supplied as needed through holes 32 in the links. The connection may be assembled readily by inserting the sphere 14 in the inner link-depressions and then forcing the spring into place, with the stud-heads 24 in the outer link-depressions. The depth to which the sphere enters the links and the force exerted by the spring maintain the elements securely against accidental separation.

This invention is not confined in its application to the connection of two primary members but may be utilized for joining a greater number. In Figs. 3 and 4 is illustrated means for connecting three members. These may consist of a toggle-lever, made up of the arms 34 and 36, and a link 38 extending from the juncture of the arms. The arm 34 is shown as pivoted to a fixed bracket 40, and the arm 36 may transmit power applied to the toggle through the link 38. The meeting ends of these three primary members overlap, with the arm 34 between the arm 36 and the link 38. In the opposite faces of the intermediate member are semi-spherical depressions 42, 42, with which register depressions 44, 44 in the inner faces of the outer members. In these pairs of depressions fit the connecting spheres 46, 46. A U-spring 48 extends over the edges of the three primary members and carries spherical-headed studs 50 lying in depressions 52 in the outer faces of the outer members. As the link shifts the toggle between its extreme positions, there is the same capacity of the connected elements for free lateral movement and a like constant maintenance of tight joints as in the embodiment of the invention first disclosed. The lubricating means may be the same as before.

Having described my invention, what I claim as new and desire to secure by Letters Patent of the United States is:

1. The combination with overlapping primary members in the faces of which are opposite depressions each of spherical contour, of spherical connecting means lying in the depressions, and a U-spring having at its inner ends projections engaging the outer faces of the primary members, said spring being yieldable to permit universal movement of one member with respect to the other member.

2. The combination with two outer primary members and intermediate primary member, said intermediate member being provided with opposite depressions and each of the outer members having a depression registering with one of the depressions of the intermediate member, of a connecting member located in each of the pair of registering depressions, and a U-spring for pressing the primary members into engagement with the connecting members and being yieldable to permit universal movement between the primary members and the intermediate member with respect to one another.

3. The combination with overlapping primary members extending in different directions from the area of overlap, said members having complementary substantially semi-spherical depressions, of spherical connecting means lying in the depressions, and a spring engaging the primary members and passing outside the connecting means, said spring being yieldable to permit universal movement of one member with respect to another of the members.

4. The combination with overlapping primary members extending in different directions from the area to overlap, said members having complementary substantially semi-spherical depressions, of spherical connecting means lying in the depressions, and a U-shaped spring engaging the outer faces of the primary members for holding the parts in engagement, said spring being yieldable to permit universal movement of one member with respect to another of the members.

FREDERIC E. BERTRAND.

CERTIFICATE OF CORRECTION.

Patent No. 2,173,155.   September 19, 1939.

FREDERIC E. BERTRAND.

It is hereby certified that error appears in the printed specification of the above numbered patent requiring correction as follows: Page 2, second column, line 19, claim 4, for "to" read --of--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.